United States Patent [19]
Pritchett

[11] Patent Number: 6,147,772
[45] Date of Patent: Nov. 14, 2000

[54] SYSTEM AND METHOD FOR COLOR SPACE CONVERSION USING AN EXTENDED COLOR SPACE

[75] Inventor: Scott K. Pritchett, Fremont, Calif.

[73] Assignee: Silicon Graphics, Inc., Mountain View, Calif.

[21] Appl. No.: 09/304,635

[22] Filed: May 4, 1999

Related U.S. Application Data

[63] Continuation of application No. 08/623,703, Mar. 29, 1996, Pat. No. 5,946,113.

[51] Int. Cl.[7] .......................................................... G03F 3/08
[52] U.S. Cl. ............................................ 358/1.9; 358/504
[58] Field of Search ................... 358/1.9, 504, 515–523, 358/539; 348/223, 557, 577, 603

[56] References Cited

U.S. PATENT DOCUMENTS

| | | | |
|---|---|---|---|
| 4,941,038 | 7/1990 | Walowit | 358/80 |
| 5,493,677 | 2/1996 | Balogh et al. | 395/600 |
| 5,583,665 | 12/1996 | Gregory, Jr. et al. | 358/504 |
| 5,594,558 | 1/1997 | Usami et al. | 358/518 |

*Primary Examiner*—Thomas D. Lee
*Assistant Examiner*—Stephen Brinich
*Attorney, Agent, or Firm*—Sterne, Kessler, Goldstein & Fox P.L.L.C.

[57] ABSTRACT

A system and method for converting a color uses an extended color space to convert a color from a first color space to a second color space. The extended color space is extended from the second color space. In other words, the extended color space has increased valid component ranges compared with the second color space to accommodate the conversion of any valid colors from the first color space. Subsequent operations on the converted color in the extended color space occur without the presence of conversion artifacts found in many conventional color space converters.

20 Claims, 6 Drawing Sheets

SYSTEM AND METHOD FOR COLOR SPACE CONVERSION USING AN EXTENDED COLOR SPACE

RELATED APPLICATIONS

This patent application is a continuation of application Ser. No. 08/623,703 filing date Mar. 29, 1996, entitled "System and Method for Color Space Conversion Using an Extended Color Space" which issued on Aug. 31, 1999 as U.S. Pat. No. 5,946,113.

This patent application is related to a commonly owned patent application entitled "System and Method for Color Space Conversion," having a application Ser. No. of 08/566,660 and a filing date of Dec. 4, 1995, which is incorporated herein by reference in its entry.

BACKGROUND OF THE INVENTION

1. Field of the Invention

The present invention relates generally to displaying video and computer images, and more specifically, to converting colors in the images from one color space to another color space.

2. Related Art

An image to be displayed on a monitor or television screen is represented by a matrix of points referred to as pixels. The pixels are scanned across the monitor or screen both horizontally and vertically. Each pixel has an associated color that is typically represented by a particular set of values of three different components. The three different components used to represent the color define a color space.

The color space is a mathematical representation of a set of colors. Several color spaces are presently used in various different applications. An RGB color space represents color as levels of red (R), green (G), and blue (B). The RGB color space is used in color computer graphics. A YUV color space represents color as intensity (Y) and two color difference components (U, V). The YUV color space is used in television equipment and was developed to accommodate both black-and-white and color televisions. A YCrCb color space (a scaled and offset version of the YUV color space color) also represents color as intensity (Y) and two color difference components (Cr,Cb). The YCrCb color space was developed as part of a world-wide digital component video standard. Other color spaces include CMYK, HSI, and HSV.

Each color space has been developed according to various industry standards. These standards define a valid range of values for each of the respective components referred to as a valid component range. These standards also define equations and coefficients to be used to convert the color of a pixel from one color space to another color space. For example, conversion between the RGB color space and the YCrCb color space is accomplished with a well established set of equations.

Conversion of the color between various color spaces is necessary as the lines between digital computer equipment and television equipment becomes blurred. For example, multimedia systems employing a computer system to display video images must convert the video image into an image displayable on the computer. The multimedia system must convert the video image from the YCrCb color space to a computer image in the RGB color space.

One problem associated with this conversion is due to the valid component ranges of the components in the respective color spaces. The valid component ranges in a particular color space can be represented as a rectangular cube in three dimensional space. Each color in the particular color space is defined by a set of three points referred to as a triplet, within the rectangular cube. A triplet having each of its components within the valid component range of the color space, and hence, within the cube of the color space, is referred to as a valid triplet. A triplet having one or more components outside the valid component range of the color space, or outside the cube of the color space, is referred to as an invalid triplet.

A cube representing the RGB color space (RGB cube) lies entirely within a cube representing the YCrCb color space (YCrCb cube). Thus, every valid RGB triplet corresponds to a valid YCrCb triplet, but not every valid YCrCb triplet corresponds to a valid RGB triplet because a large percentage of valid YCrCb triplets lie outside the RGB cube.

One method conventional systems have used to address invalid RGB triplets is to clip, clamp, or truncate each component to its maximum (or minimum) value. This method produces an undesirable color shift that, in many cases, is readily apparent to the viewer.

Another method conventional systems have used to address invalid RGB triplets is to choose RGB values that hold luminance and hue constant and reduce saturation until the invalid RGB triplet becomes valid. This method shifts bright colors to white and dark colors to black. As a result, the overall displayed image becomes more black and white. This effect is also readily apparent to the viewer.

A second problem associated with the conversion of a color between color spaces is due to conventional systems attempting to solve the first problem. Once a conventional system has adjusted, or compensated, the invalid RGB triplet to be within the valid RGB component range, the original YCrCb triplet can not be subsequently recovered from the adjusted, or compensated, RGB triplet. Thus, in conventional systems, not only is some color information lost during the conversion, but conventional systems do not provide any means for storing or recovering the lost color information.

What is needed is a system and method for color space conversion that preserves the quality of the original image with respect to the viewer without the undesirable effects introduced by conventional systems and that allows the original image to be subsequently recovered without loss of information.

SUMMARY OF THE INVENTION

The present invention is directed to a system and method for converting a color from a first color space to a second color space through the use of an extended second color space. The extended second color space is extended (i.e., has increased valid component ranges) from the second color space so that all valid colors from the first color space can be converted to the extended second color space and represented as valid colors therein.

A feature of the present invention is that operations (such as graphics imaging operations) subsequent to the conversion of the color to the extended second color space are not performed on colors having conversion artifacts. Conversion artifacts are the result of adjusting or forcing an invalid color into the second color space. The result is that colors with conversion artifacts are only approximations of the original color. The present invention allows the invalid color in the second color space to be represented as a valid color in the extended color space. Thus, no approximation is made to result in a conversion artifact. Subsequent operations performed on colors converted according to the present invention are performed on the original color rather than an approximation to the original color. The result is a truer representation of the original color after the conversion and subsequent operations.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Overview

The present invention is directed to a system and method for converting a color represented in a first color space into a corresponding color represented in an extended version of a second color space, i.e., an extended color space. The present invention uses the color represented in the extended color space to perform all operations, such as computer imaging operations. Once all operations are complete, the color in the extended second color space is adjusted to a valid color in the second color space, converted into a third color space, or converted back into the first color space.

Example Environment

The present invention is now described in terms of an example environment. Specifically, the present invention is described in terms of converting a color in a YCrCb color space to a corresponding color in an RGB color space. Description in these terms is useful because this particular conversion demonstrates an extreme case among color space conversions. Furthermore, this conversion is useful for converting images between computer equipment and video equipment. However, description in these terms is provided for convenience only. It is not intended that the invention be limited to application in this example environment. In fact, after reading the following description, it will become apparent to a person skilled in the relevant art how to implement the invention in alternative environments. That is, the present invention applies to conversions between other color spaces as well.

Figure 1:
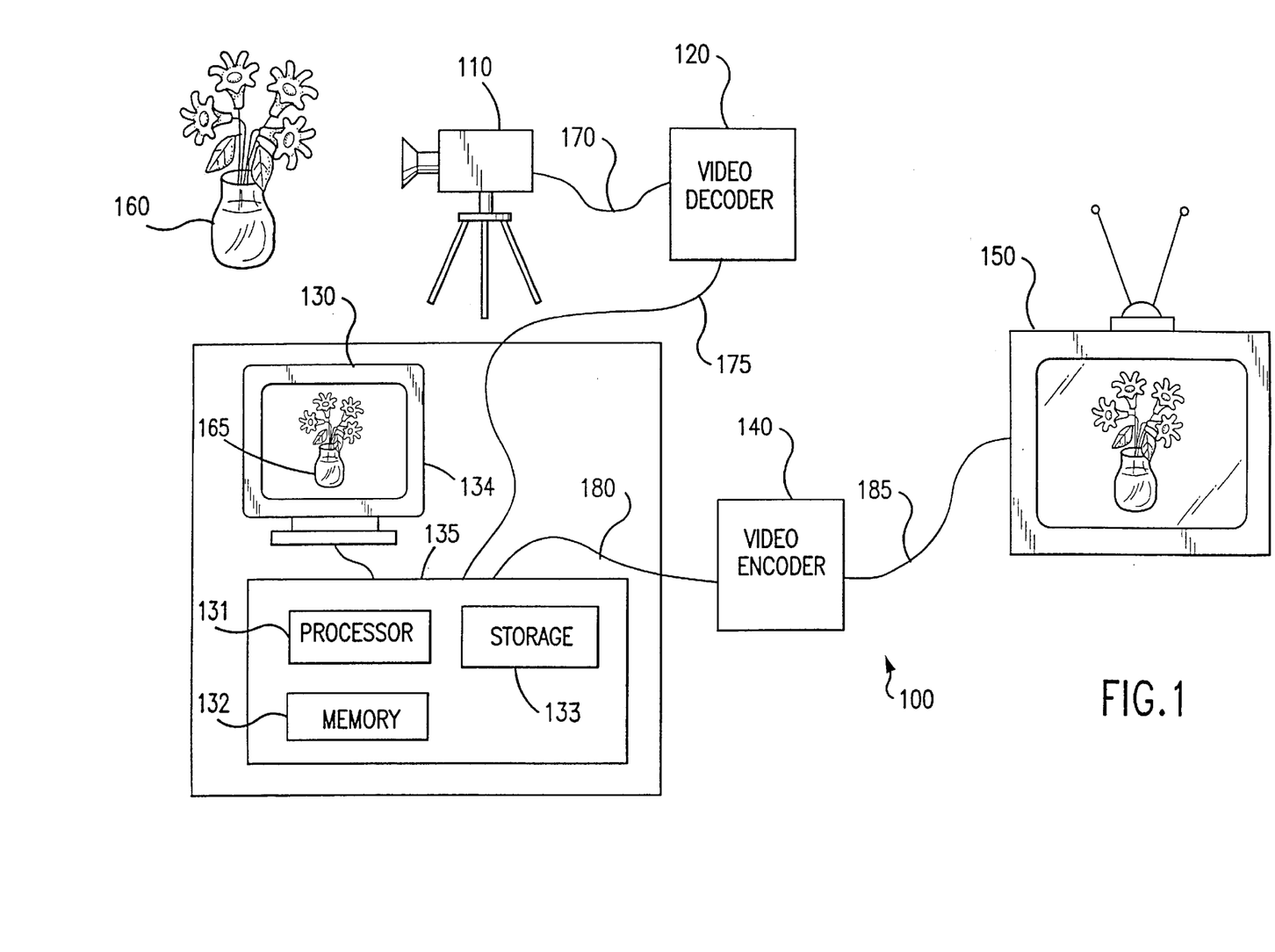
FIG. 1 illustrates a video imaging system that utilizes the present invention.

FIG. 1 illustrates a video imaging system 100 that serves as an example environment for the present invention. Video imaging system 100 includes a video camera 110, a video decoder 120, a computer system 130, a video encoder 140, and a television 150. Computer system 130 includes a general purpose computer 135 including processor 131, a memory 132, and a storage device 133. Computer system 130 also includes a monitor 134.

Video camera 110 creates an optical image of an object 160. Video camera 110 transforms the optical image of object 160 into a video signal 170 representing the optical image. Video decoder 120 receives video signal 170 from video camera 110 and transforms video signal 170 into a computer graphics signal 180 so that computer system 130 can operate upon and display a computer image 165 of object 160 on monitor 134.

Various computer software applications are available that allow a user, via computer system 130, to operate on computer image 165. Such applications allow a user to modify and/or alter computer image 165 with a variety of operations including enhancement, sharpening, blurting, scaling, color correction, painting, and rotoscoping. Once the user has modified computer image 165, the user, for example, may desire to output modified computer image 165 to other video equipment such as television 150. Computer system 130 outputs a computer graphics signal 180 representative of modified computer image 165. However, before television 150 can display modified computer image 165, computer graphics signal 180 must be transformed back into a video signal 185. This is accomplished via video encoder 140. Video encoder 140 receives computer graphics signal 180 from computer system 130 and transforms computer graphics signal 180 into video signal 185.

Color Space Conversions

One aspect of the transformations performed by video decoder 120 and video encoder 140 is to convert colors back and forth between a color space used by video equipment and a color space used by computer equipment. Both types of equipment represent a discrete point in an image as a pixel. One characteristic of the pixel is the pixel's color. Video equipment typically represents color in a YCrCb color space, while computer equipment typically represents color in a RGB color space. Thus, video decoder 120 must convert a color of a pixel represented in the YCrCb color space into the corresponding color represented in the RGB color space. Conversely, video encoder140 must convert a color of a pixel represented in the RGB color space into the corresponding color represented in the YCrCb color space.

Figure 2:
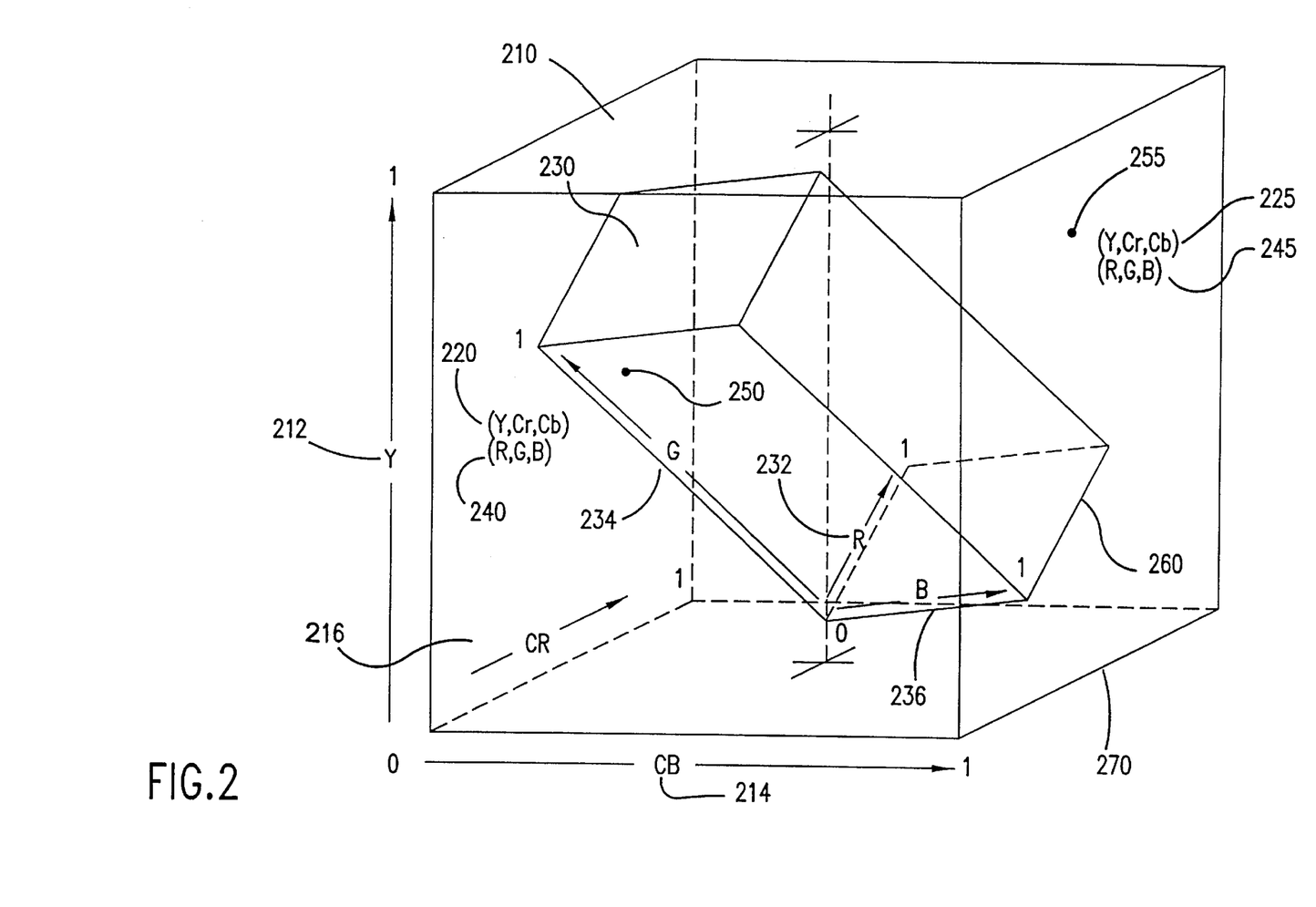
FIG. 2 illustrates the relationship between a YCrCb color space and an RGB color space.

FIG. 2 illustrates the relationship between a YCrCb color space 210 and an RGB color space 230. YCrCb color space 210 is comprised of a luminance component 212 (Y component 212) and two color difference signal components: a first color difference component 214 (Cb component 214) and a second color difference component 216 (Cr component 216). The three components, i.e., Y component 212, Cb component 214, and Cr component 216, form a YCrCb triplet 220. YCrCb triplet 220 represents color 250 in YCrCb color space 210.

In contrast, computer equipment typically uses a RGB color space 230. RGB color space 230 is comprised of a red component 232 (R component 232), a green component 234 (G component 234), and a blue component 236 (B component 236). The three components, i.e., R component 232, G component 234, and B component 236, form a RGB triplet 240. RGB triplet 240 represents color 250 in RGB color space 230.

As shown in FIG. 2, RGB color space 230 is represented by an RGB cube 260. RGB cube 260 defines RGB color space 230 in terms of a fixed range of values for each component. This fixed range of values for each component is referred to as a valid component range. Only colors within RGB cube 260 can be validly represented in RGB color space 230. A color outside RGB cube 260, such as color 255, has one or more components outside the valid component range for RGB color space 230. For purposes of this discussion, the valid component range for RGB color space 230 varies between 0 (no amount of the component) and 1 (a maximum amount of the component) for each of R component 232, G component 234, and B component 236. As will be apparent to those skilled in the art, the ranges can be scaled accordingly. Typical systems employing RGB color space 230 represent each value in this range with eight or more bits. A preferred embodiment of the present invention uses ten bits to represent this range.

YCrCb color space 210 is represented by YCrCb cube 270. Each component in YCrCb color space 210 also has a valid component range. For purposes of this disclosure, Y component 212, Cb component 214, and Cr component 216 in YCrCb color space 210 will be described as each having a valid component range of 0 to 1. As would be apparent, this range may be scaled appropriately depending on the number bits used, etc. Even though the scaled ranges may appear the same, the ranges between RGB color space 230 and YCrCb color space 210 are not equivalent as a result of the components used in the two color spaces as is evident in FIG. 2.

FIG. 2 shows that YCrCb cube 270 is large that RGB cube 260. In fact, RGB cube 260 is entirely within YCrCb cube 270. This is due to the choice of multiplication coefficients in the conversion equations between the respective color spaces. FIG. 2 shows that every RGB triplet 250 having components within the valid component range of RGB color space 230 corresponds to a valid YCrCb triplet 220 having components within the valid component range of YCrCb color space 210. In other words, every valid color in RGB color space 230 corresponds to a valid color in YCrCb color space 210. However, the reverse is not true. Every valid color in YCrCb color space 210 does not necessarily correspond to a valid color in RGB color space 230. This is best illustrated by the following example. Color 250 can be equivalently represented by either YCrCb triplet 220 or RGB triplet 240. Color 255 can only be exactly represented by YCrCb triplet 280. Because color 255 cannot be represented within RGB cube 260, color 255 is an invalid color in RGB color space 230.

As discussed above, conventional techniques force or adjust color 255 into RGB cube 260 by various methods. In addition to those discussed above, an improved technique is disclosed in commonly owned, copending patent application entitled "System and Method for Color Space Conversions," having an application Ser. No. of 08/566,660 and a filing date of Dec. 4, 1995, which is incorporated herein by reference in its entirety. This technique shifts color 255 via a constant hue algorithm to a valid color in the appropriate color space and maintains a compensation factor so that the original color 255 can be subsequently recovered in a conversion back to the original color space.

Rather than performing a compensation technique such as those discussed above that force or adjust an invalid color (such as color 255) in the second color space (such as color space 230) into a valid region of the second color space (such as RGB cube 260), the present invention maintains the otherwise invalid color in an extended color space. The extended color space is defined as a color space having components corresponding to the second color space with valid component ranges that are sufficient to accommodate all valid colors in the first color space. By definition, the conversion of a valid color in the first color space will always result in a valid color in the extended color space.

Figure 3:
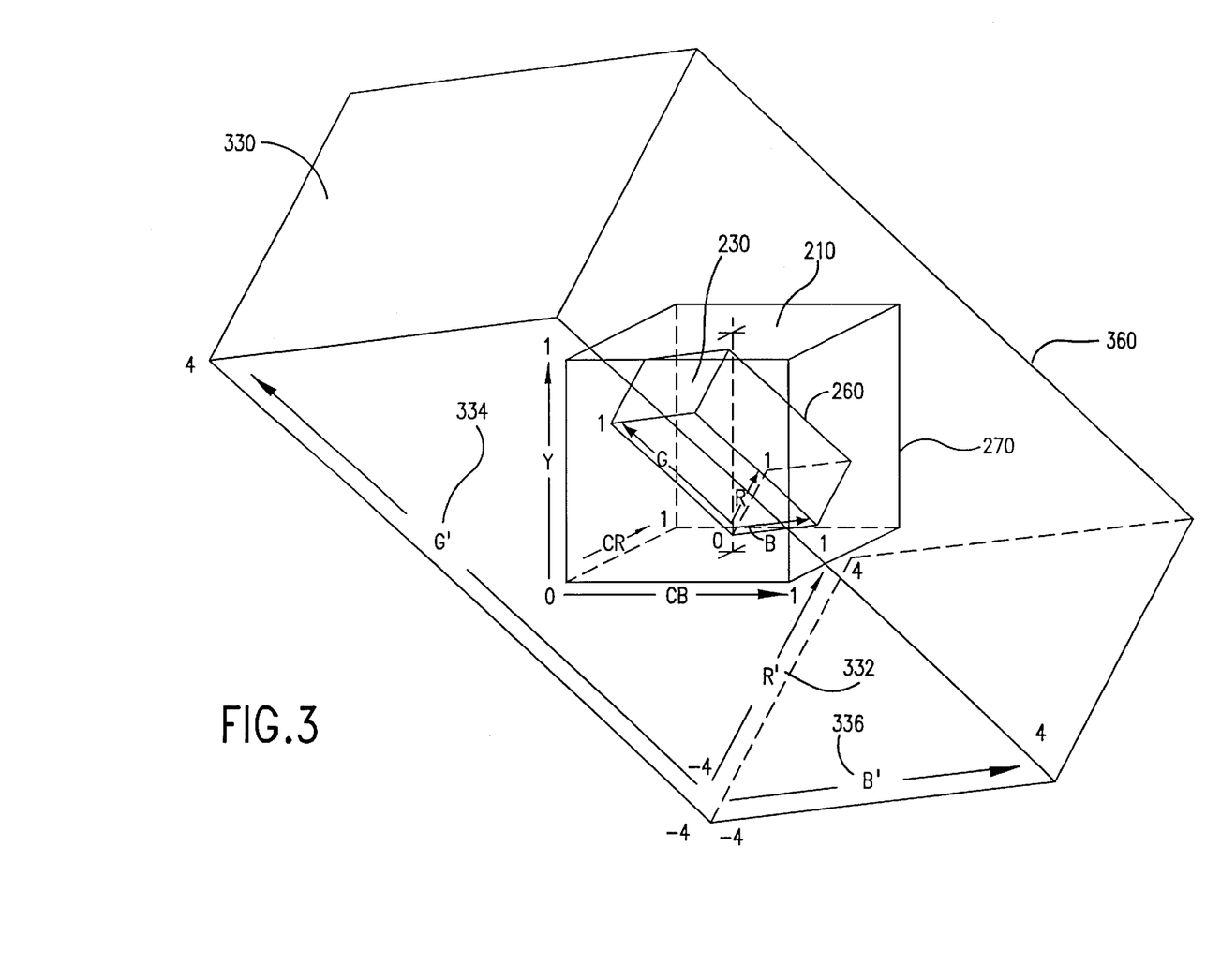
FIG. 3 illustrates an extended RGB color space used by the present invention.

FIG. 3 illustrates an extended color space 330 corresponding to RGB color space 230 used by the present invention. In particular, FIG. 3 illustrates the relationship between RGB color space 230, YCrCb color space 210, and an extended RGB color space 330. As shown, an extended RGB cube 360 defining extended RGB color space 330 includes YUV cube 270 in its entirety. Thus, extended RGB color space 330 includes all valid colors in YUV color space 210, even those that are invalid with respect to RGB color space 230.

Extended RGB color space 330 is identical to RGB color space 230 except for an increase in the valid range of components of extended RGB color space 330. These components are shown as R' component 332, G' component 334, and B' component 336. The equations governing color conversions between an original color space, such as YCrCb color space 210, and RGB color space 230 are the same as those between the original color space and extended RGB color space 330. In other words, extended RGB color space 330 provides additional headroom (as compared with RGB color space 230) to accommodate the entire dynamic range of valid colors in the original color space. In a preferred embodiment of the present invention, the valid range of the each of the components of extended RGB color space 330 is −4 to 4 represented with thirteen bits including ten fractional bits.

Figure 4:
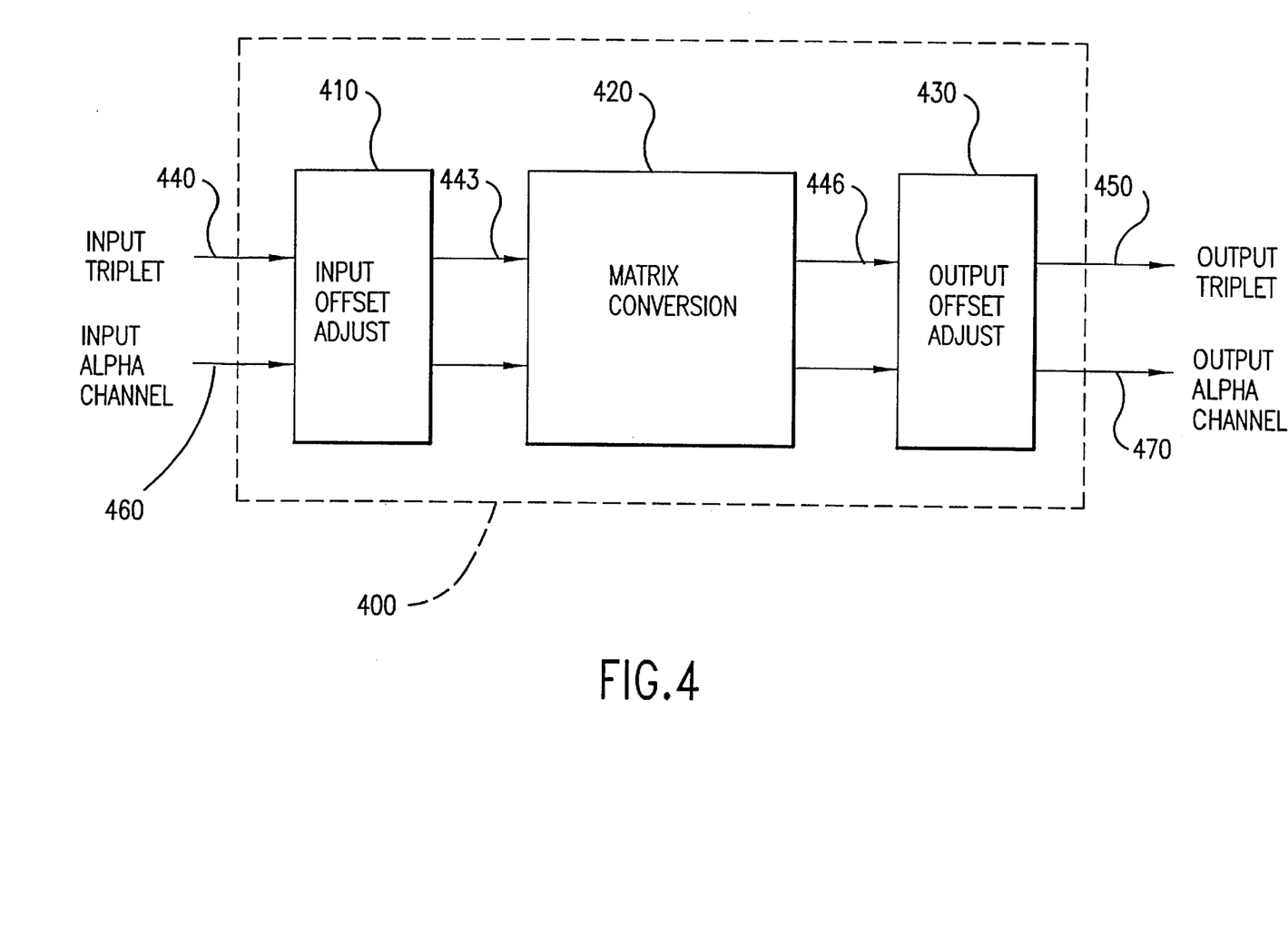
FIG. 4 is a block diagram illustrating a color space converter according to the present invention.

FIG. 4 is a block diagram illustrating a color space converter 400 according to the present invention. In a preferred embodiment, color space converter 400 includes a input offset adjust 410, a matrix conversion 420, and an output offset adjust 430. Color space converter 400 receives a color, for example, valid triplet 225 in YCrCb color space, as an input triplet 440. Color space converter 400 converts valid triplet 225 into an output triplet 450. Output triplet 450 corresponds to a valid triplet in extended RGB color space 330. Output triplet 450 may or may not be a valid triplet with respect to RGB color space 230.

Figure 5:
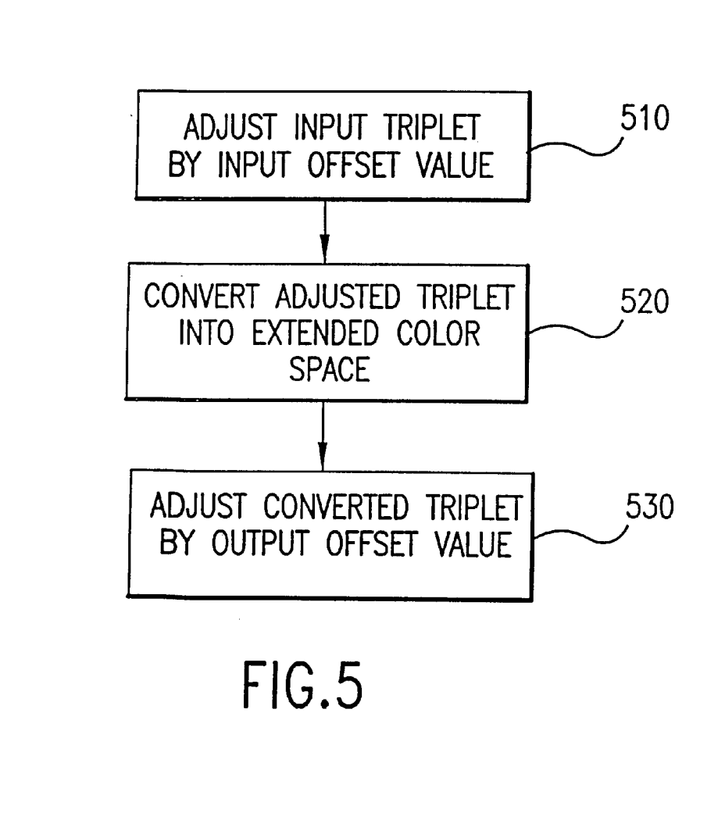
FIG. 5 illustrates the steps performed by a preferred embodiment of the color space converter while converting a color from one color space to another color space through the use of an extended color space.

FIG. 5 illustrates the steps performed by a preferred embodiment of color space converter 400 while converting a color from one color space to another color space through the use of an extended color space. For purposes of illustration, color 255 will be converted from YCrCb color space 210 to RGB color space 230 through the use of extended color space 330. The following discussion is made with reference to FIG. 4 and FIG. 5.

In a step 510, input offset adjust 410 receives input triplet 440 and adjusts input triplet 440 by an input offset value to remove any bias that may be present therein due to the color space in which it is represented. In a preferred embodiment, when input triplet 440 is comprised of 10-bit data, input offset values include 0, −64, and −512 for standard conversions. As is well known, these offset values correspond to typical biases used in various color spaces according to various industry standards. As would be apparent, other values could be used as well. Input offset adjust 410 outputs an adjusted triplet 443.

In a step 520, matrix conversion 420 receives adjusted triplet 443 and converts adjusted triplet 443 to a converted triplet 446 according to conversion equations governing the relationship between YCrCb color space 210 and RGB color space 230. The conversion equations governing the relationships between color spaces are well known. These conversion equations may be found in various texts including Keith Jack, *Video Demystified: A Handbook for the Digital Engineer,* High Text Publications, Inc., 1993. After the conversion, converted triplet 446 is in extended RGB color space 330.

In a step 530, output offset adjust 430 receives converted triplet 446 and adjusts converted triplet 446 by an output offset value to add any bias that may be desired therein. In a preferred embodiment, output offset values include 0, 64, 512 for standard conversions as discussed above. Output offset adjust 430 outputs an output triplet 450.

In a preferred embodiment, an input alpha channel 460 is processed in a similar manner to input triplet 440. In conventional systems, an alpha channel is used to represent opacity of a pixel. Each color space has a corresponding representation for opacity. Thus, opacity must be converted between color spaces in addition to a color. Thus, as shown in FIG. 4, input alpha channel 460, corresponding to a first color space such as YCrCb color space 210, is adjusted by an appropriate input offset value, converted to an appropriate representation corresponding to an extended color space, such as extended RGB color space 330, and adjusted by an appropriate output offset value according to various industry standards. The result is output alpha channel 470 corresponding to extended RGB color space 330.

In alternate embodiments, the functions of input offset adjust 410 and output offset adjust 430 may be incorporated into a single offset adjust that incorporates the input offset value and output offset value into a single offset value. As would be apparent, the single offset adjust may be implemented either before or after matrix conversion 420. By incorporating the offset adjusts into the single offset adjust, the single offset value is no longer an integer value as was the case for separate offset adjusts.

According to the present inventions, any operations, such as computer imaging operations, that are to be performed on the color (either valid or invalid) in RGB color space 230 are performed on the color in extended RGB color space 330. Performing such operations on the color in extended RGB color space 330 reduces "conversion artifacts." Conversion artifacts are the result of forcing or adjusting an invalid color to a valid color in RGB color space 230 and operating on the forced or adjusted color. These are best described by way of example.

For example, a color is converted to RGB color space 230. As a result of a conversion, the color has an invalid triplet value of (1.2,0,0). The color is invalid in RGB color space 230 because the R component 232 exceeds its valid component range of 0 to 1. In conventional systems that clamp or truncate the invalid triplet value to the valid component range of RGB color space 230, the color is clamped to a triplet value of (1,0,0). However, in extended RGB color space 330, where the R' component has a valid range of −4 to 4 in a preferred embodiment, the color is a valid triplet and retains its original triplet value of (1.2,0,0).

Suppose an operation is performed on the color whose effect is to multiply the triplet value by 0.5. In RGB color space 230, the operation returns a triplet value of 0.5*(1,0, 0), or (0.5,0,0). In extended RGB color space 330, the operation returns a triplet value of 0.5*(1.2,0,0), or (0.6,0,0). Notice that, after the operation, both triplet values represent valid colors in RGB color space 230. However, the result of the operation performed in RGB color space 230 is different from that performed in extended RGB color space because of the conversion artifact.

Figure 6:
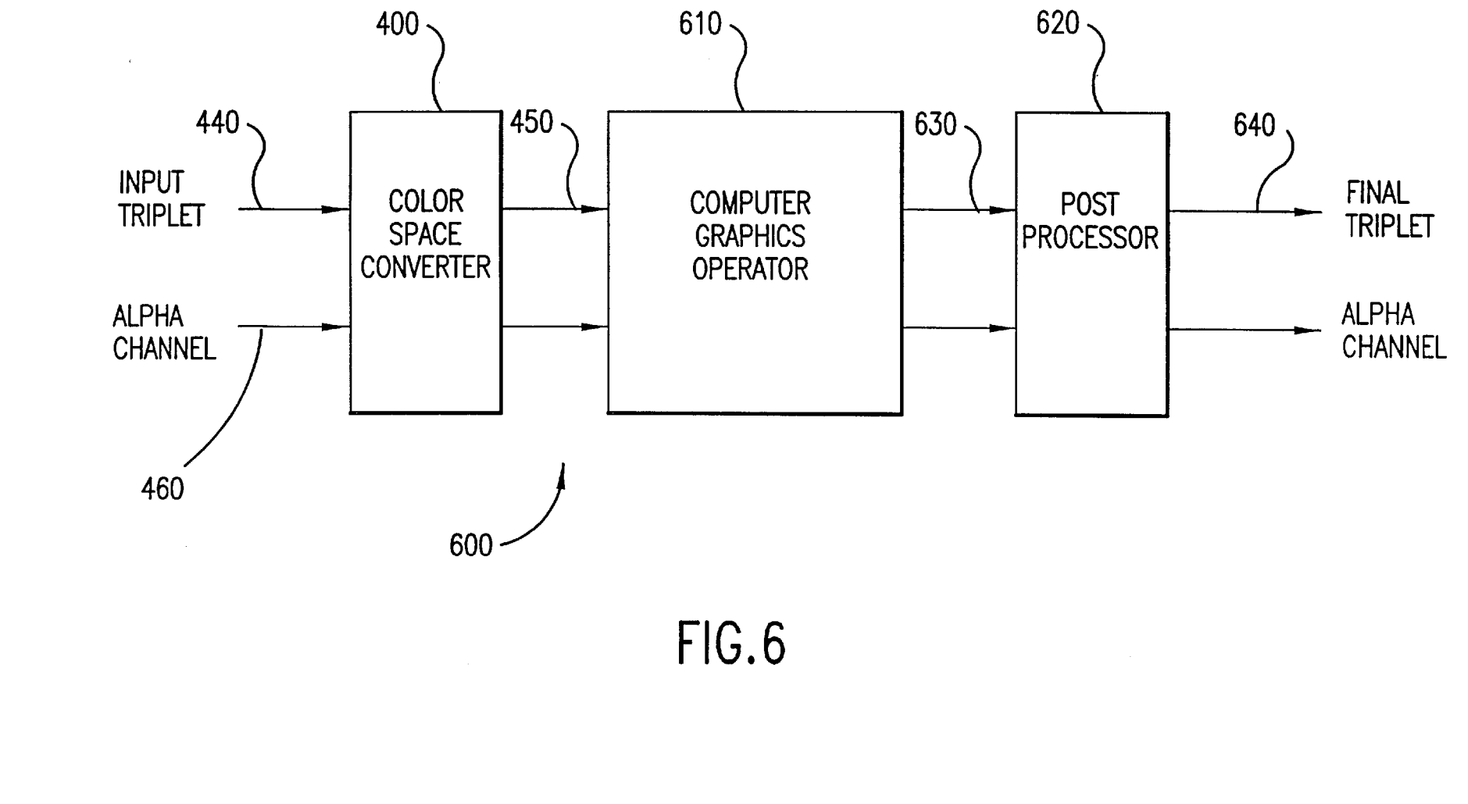
FIG. 6 is a block diagram illustrating a system that uses the color space converter according to the present invention.
Figure 7:
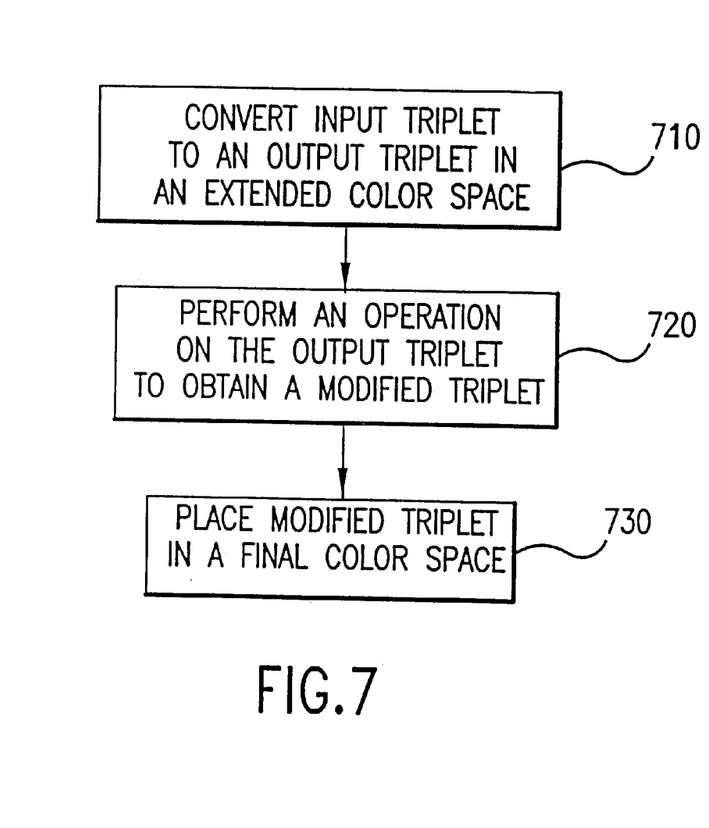
FIG. 7 illustrates the steps performed by a system that uses the color space converter according to the present invention.

FIG. 6 is a block diagram illustrating a system 600 that employs color converter 400 of the present invention. FIG. 7 illustrates the steps performed by system 600 according to the present invention. System 600 includes color space converter 400, a computer graphics operator 610, and a post processor 620. As discussed above, in a step 710, color space converter 400 converts a color represented as input triplet 440 in a first color space (i.e., YCrCb color space 210) to output triplet 450 in an extended second color space (i.e., extended RGB color space 330).

In a step 720, computer graphics operator 610 performs various graphics and imaging operations on output triplet 450 using extended RGB color space 330. These operations include enhancement, sharpening, blurring, scaling, color correction, painting, and rotoscoping, and other such imaging operations. Computer graphics operator 610 outputs a modified triplet 630 in extended RGB color space 330.

Modified triplet 630 may or may not be a valid color in RGB color space 230. However, modified triplet 630 does not include any conversion artifacts as a result of conversion from YCrCb color space 210 to RGB color space 230. Because no conversion artifacts exist, modified triplet 630 may be converted back to YCrCb color space 210 as if computer graphics operator 610 had performed its operations entirely within YCrCb color space 210 rather than extended RGB color space 330.

In a step 730, post processor 620 receives modified triplet 630 and places it in a form for output as a final triplet 640. Post processor 620 may perform several different operations depending on the form desired for final triplet 640. For example, final triplet may be desired to be in YCrCb color space 210. In this example, post processor 620 converts modified triplet 630 from extended RGB color space 330 to YCrCb color space 210. In this example, post processor 620 can be implemented using color space converter 400 with the appropriate modifications to the conversion equations.

In another example, final output triplet 640 is desired to be in RGB color space 230. In this example, post processor 610 clamps or adjusts modified triplet 630 from extended RGB color space 330 to RGB color space 230 if modified triplet 630 represents an invalid color in RGB color space 230.

In yet another example, final output triplet 640 is desired to be in color space other that YCrCb color space 210 or RGB color space 230. In this example, post processor 620 may be implemented as color space converter 400 with the appropriate modifications to implement the conversion equations defining the relationship between extended RGB color space 330 and the other color space.

In still another example, final output triplet 640 is desired to be in extended RGB color space 330. In this example, post processor 620 may be eliminated from system 600.

Although the invention has been described in detail in terms of specific embodiments, various modifications can be made without departing from the scope of the invention.

What is claimed is:

1. A method of processing color, comprising the steps of:
   (a) converting a representation of a color in a first color space to a representation in an extended second color space, wherein said extended second color space has the same components as a second color space but has component ranges exceeding the component ranges of said second color space, such that all valid colors of said first color space can be converted to said extended second color space and represented as valid colors therein without requiring additional modification; and (b) performing an imaging operation on said representation in said extended second color space, wherein a color resulting from said imaging operation is represented without conversion artifacts in said extended second color space, and wherein said imaging operation modifies said representation in said extended second color space for purposes of modifying a computer image.

2. The method of claim 1, wherein step (a) comprises the step of matrix conversion of said representation of said color in said first color space to said representation in said extended second color space.

3. The method of claim 1, wherein step (a) comprises the step of performing an input offset adjustment on said representation of said color in said first color space to remove any bias present therein due to representation in said first color space.

4. The method of claim 1, wherein step (a) comprises the step of performing an output offset adjustment on said representation in said extended second color space to add any bias necessary due to representation in said extended second color space.

5. The method of claim 1, wherein said imaging operation comprises the step of rotoscoping said representation in said extended second color space.

6. The method of claim 1, wherein said imaging operation comprises the step of enhancement of said representation in said extended second color space.

7. The method of claim 1, wherein said imaging operation comprises the step of sharpening of said representation in said extended second color space.

8. The method of claim 1, wherein said imaging operation comprises the step of blurring of said representation in said extended second color space.

9. The method of claim 1, wherein said imaging operation comprises the step of scaling of said representation in said extended second color space.

10. The method of claim 1, wherein said imaging operation comprises the step of color correction of said representation in said extended second color space.

11. The method of claim 1, wherein said imaging operation comprises the step of painting of said color representation in said extended second color space.

12. The method of claim 1, further comprising the following step, performed after step (b):

(c) converting said color resulting from said imaging operation to another color space.

13. The method of claim 12, wherein step (c) comprises the step of converting a representation of said color resulting from said imaging operation to said second color space.

14. The method of claim 12, wherein step (c) comprises the step of converting a representation of said color resulting from said imaging operation to said first color space.

15. The method of claim 12, wherein step (c) comprises the step of converting a representation of said color resulting from said imaging operation to a third color space.

16. A system for color processing, comprising:

a color space converter for converting a representation of a color in a first color space to a representation in an extended second color space, wherein said extended second color space has the same components as a second color space but has component ranges exceeding the component ranges of said second color space, such that all valid colors of said first color space can be converted to said extended second color space and represented as valid colors therein without requiring additional modification.

17. The system of claim 16, further comprising:

an imaging operator for performing an imaging operation on said representation of said color in said extended second color space, wherein a color resulting from said imaging operation is represented without conversion artifacts in said extended second color space and wherein said imaging operation modifies said representation in said extended second color space for purposes of modifying a computer image.

18. The system of claim 17, further comprising:

a post-processor having means for adjusting said color resulting from said imaging operation and represented in said extended second color space to a representation in said second color space.

19. The system of claim 16, wherein said color space converter comprises:

matrix conversion means for performing calculations necessary to convert said representation of said color in said first color space to said representation in said extended second color space; and offset adjust means for adjusting for any biases that exist due to representation in said first color space and subsequent representation in said extended second color space.

20. The system of claim 16, wherein said color space converter comprises:

input offset adjust means for adjusting for any biases that exist in said first color space due to representation in said first color space;

matrix conversion means for performing calculations necessary to convert said representation of said color in said first color space to said representation in said extended second color space; and output offset adjust means for adjusting for any biases that exist in said second color space due to representation in said extended second color space.

* * * * *